US012380818B1

(12) United States Patent
Schwartz et al.

(10) Patent No.: US 12,380,818 B1
(45) Date of Patent: Aug. 5, 2025

(54) MULTI-DIMENSIONAL PRINTING METHOD AND APPARATUS

(71) Applicant: Bracha Partners LLC, Bayonne, NJ (US)

(72) Inventors: David Schwartz, Bayonne, NJ (US); Keng Lau, Bayonne, NJ (US)

(73) Assignee: Bracha Partners LLC, Bayonne, NJ (US)

( * ) Notice: Subject to any disclaimer, the term of this patent is extended or adjusted under 35 U.S.C. 154(b) by 0 days.

(21) Appl. No.: 18/752,784

(22) Filed: Jun. 24, 2024

Related U.S. Application Data

(63) Continuation of application No. 17/870,558, filed on Jul. 21, 2022, now Pat. No. 12,020,596.

(60) Provisional application No. 63/203,537, filed on Jul. 21, 2021.

(51) Int. Cl.
*G09F 19/12* (2006.01)
*G02B 30/26* (2020.01)

(52) U.S. Cl.
CPC ............. *G09F 19/12* (2013.01); *G02B 30/26* (2020.01)

(58) Field of Classification Search
CPC ................................ G09F 19/12; G02B 30/26
See application file for complete search history.

(56) References Cited

U.S. PATENT DOCUMENTS

| | | | | |
|---|---|---|---|---|
| 7,290,802 B1* | 11/2007 | Scarbrough | ............ | G02B 30/27 283/109 |
| 2007/0009716 A1* | 1/2007 | Crum | ........................ | B44F 1/10 428/204 |
| 2021/0021804 A1* | 1/2021 | Yang | ..................... | H04N 13/307 |
| 2021/0241658 A1* | 8/2021 | Suyal | ..................... | G09F 3/0292 |
| 2021/0382321 A1* | 12/2021 | Khayat | .................. | G02B 30/27 |
| 2022/0283444 A1* | 9/2022 | Zheng | .................. | B42D 25/351 |
| 2022/0377310 A1* | 11/2022 | Yang | ..................... | G02B 30/28 |

* cited by examiner

*Primary Examiner* — Gary C Hoge

(74) *Attorney, Agent, or Firm* — Tarter Krinsky & Drogin LLP

(57) ABSTRACT

Exemplary embodiments of the present disclosure can provide for a transparent panel that can have a featured image which can be surrounded by a pattern of repeating designs on a first side of the panel. A vinyl layer can be provided on the entire first side of the panel to assist in the featured image and repeating designs to be viewable on the second side of the panel (opposite of the first side). On the second opposite side of the panel, an area of the panel where the pattern of designs is visible is provided with a series of lens that can overly the repeating designs. In some exemplary embodiments, the lenses can project enlarged representations of the underlying repeating designs that appear to the eye as occupying a different plane than the featured image, creating a sense of depth within the image.

5 Claims, 4 Drawing Sheets

MULTI-DIMENSIONAL PRINTING METHOD AND APPARATUS

CROSS-REFERENCE TO RELATED APPLICATIONS

This application is a continuation of pending application Ser. No. 17/870,558 filed on Jul. 21, 2022, which is it issue as U.S. Pat. No. 12,020,596 on Jun. 25, 2024, which itself claims priority of Provisional Patent Application Ser. No. 63/203,537 filed Jul. 27, 2021, the entire disclosure of which is hereby incorporated herein by reference.

FIELD OF THE DISCLOSURE

The present disclosure relates to the field of graphic arts, and more specifically, to presentations having depth perception and methods of manufacturing the same.

BACKGROUND INFORMATION

There have been attempts to enhance two-dimensional graphic presentations to include depth perception. However, the prior art methods are insufficient for mass-producing high-quality images that are multi-dimensional in appearance.

SUMMARY OF EXEMPLARY EMBODIMENTS OF THE DISCLOSURE

Exemplary embodiments of the present disclosure can provide for a plastic poster, plaque, placard or similar transparent panel having a featured image which can be surrounded by a pattern of repeating designs on a first side of the panel. On a second opposite side of the panel, an area of the panel where the pattern of designs is visible is provided with a series of lens that can overly the pattern. In some exemplary embodiments, the lenses can project enlarged representations of the underlying repeating designs that appear to the eye as occupying a different plane than the featured image, creating a sense of depth within the image.

BRIEF DESCRIPTION OF THE DRAWINGS

The foregoing and other objects of the present disclosure will be apparent upon consideration of the following detailed description, taken in conjunction with the accompanying drawings, and claims, in which like reference characters refer to like parts throughout, and in which:

Figure 1:
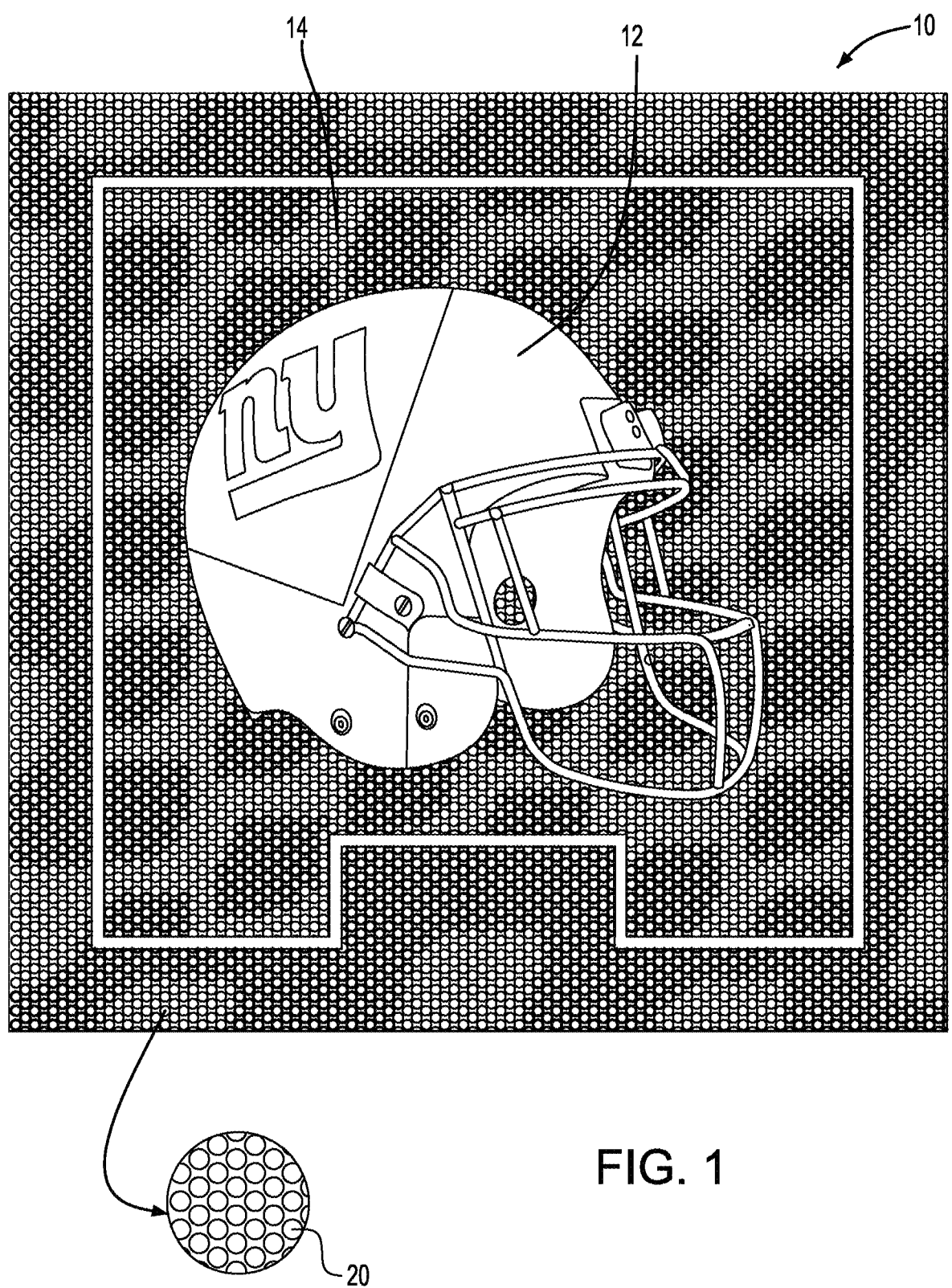
FIG. 1 is a front plan view of a panel containing a three-dimensional image in accordance with the disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure.

DETAILED DESCRIPTION OF EXEMPLARY EMBODIMENTS OF DISCLOSURE

Exemplary embodiments of the various methods and apparatuses will now be described with reference to the figures. The following description of the various embodiments is merely exemplary in nature and is in no way intended to limit the scope of the disclosure, its application, or uses. It will be understood that various modifications of the present disclosure are possible without departing from the spirit of the disclosure. Also, features or steps described herein may be omitted, additional steps or features may be included, and/or features or steps described herein may be combined in a manner different from the specific combinations recited herein without departing from the spirit of the disclosure, all as understood by those of skill in the art.

As shown in FIG. 1, a graphic presentation affixed on a panel 10 in accordance with exemplary embodiments of the disclosure are divided into at least two areas, namely, a featured image area 12 and a bordering background area 14. In some exemplary embodiments of the disclosure, there may be more than one featured image (e.g. two or more) that can be positioned in different areas of the panel 10. The panel 10 can be formed of a transparent or translucent plastic material, such as but not limited to plexiglass, acrylic, or polycarbonate.

Figure 2:
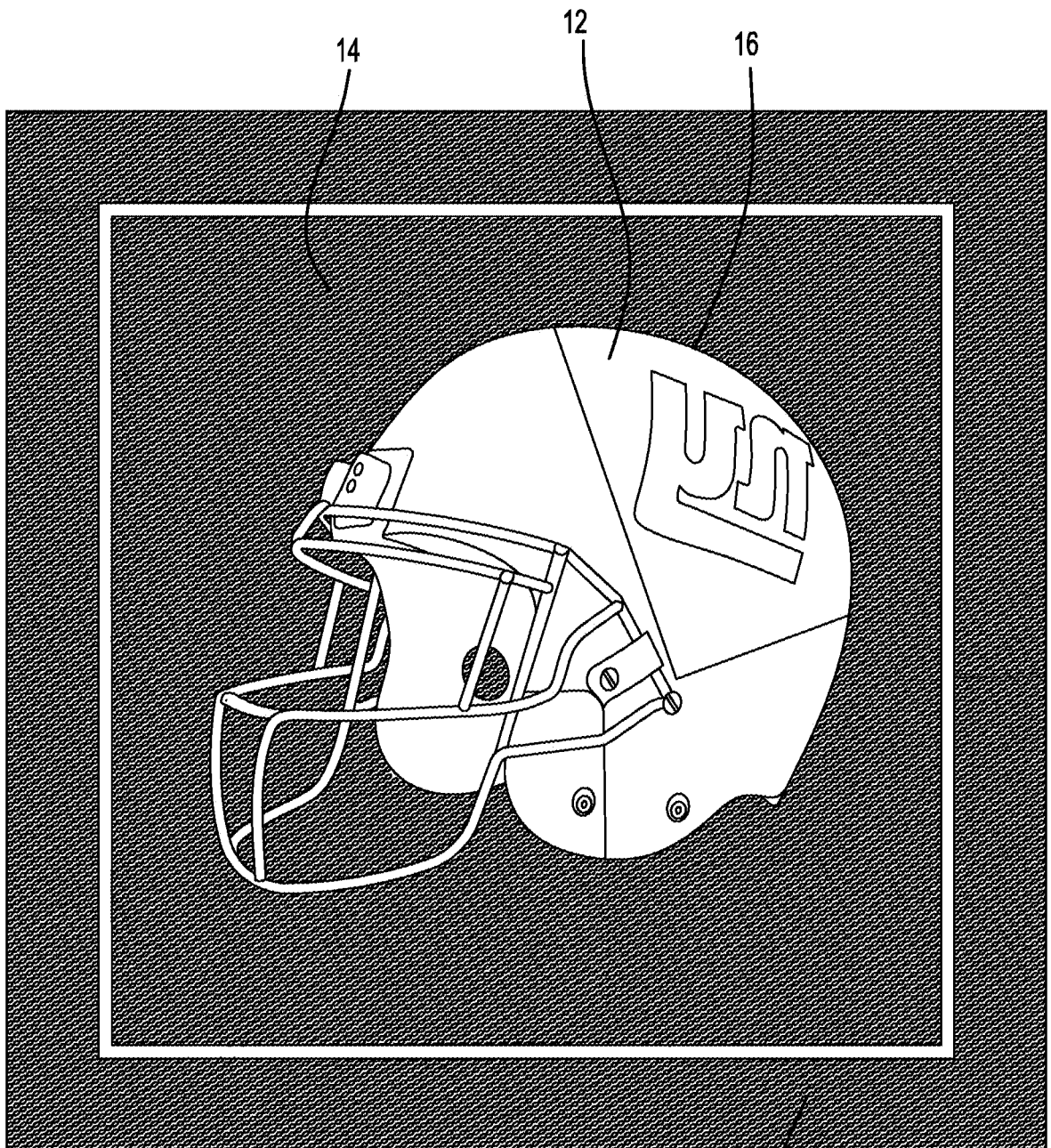
FIG. 2 is a rear plan view of a panel containing a three-dimensional image in accordance with the disclosure.
Figure 2:
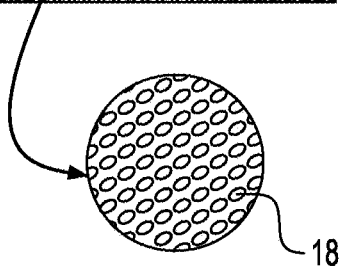

In some exemplary embodiments of the disclosure, a featured image is be printed on the rear side of the panel 10 in a reverse orientation such that it appears properly oriented when viewed from the front of the panel 10. For example, with reference to FIG. 2, a rear view of panel 10 is shown whereby featured image 16 (e.g., a football helmet) is printed in a reverse orientation. The featured image 16 appears properly oriented when viewed from the front of the panel 10, as shown in FIG. 1. As shown, a background area 14 can border the featured image area 12. In some exemplary embodiments of the disclosure, the background area 14 is be formed of a pattern of small repeating design elements. For example, as shown in the enlarged area in FIG. 2, background area 14 is formed of repeating images of a football 18.

The front of the panel 10 is be provided with a series of lenses 20 (shown enlarged in FIG. 1) that are positioned where the series of repeating images (e.g. footballs 18) are viewable from the front of the panel 10. In this regard, when viewed through lenses 20, the underlying series of repeating images are enlarged and appear as if projected onto a different image plane than the image plane belonging to the featured image 16.

Figure 3:
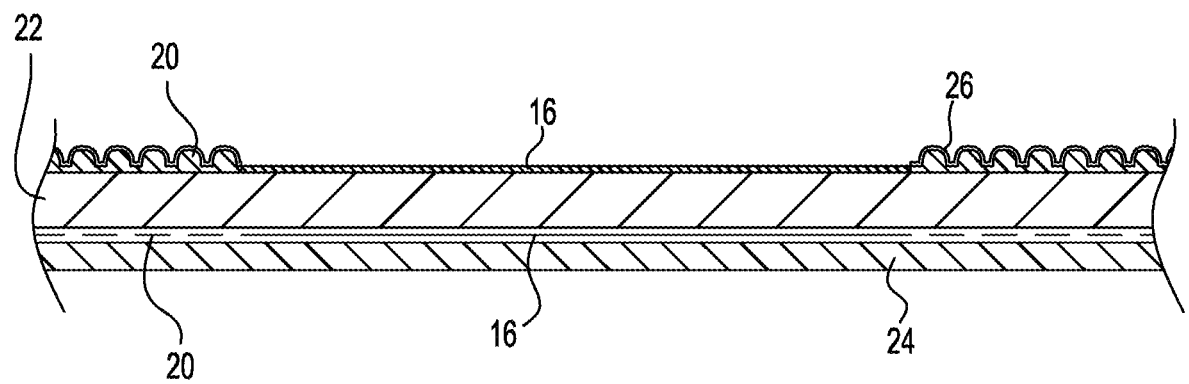
FIG. 3 is a partial schematic cross-section view through a panel as shown in FIGS. 1 and 2 in accordance with the disclosure.

FIG. 3 shows a partial cross-sectional view through panel 10. As shown, panel 10 is formed of a plastic substrate 22. In the process of manufacturing panel 10, a commercial printer is used to print a featured image 16 (e.g., football helmet) and repeating images (e.g., footballs 18) in the background area 14 bordering or surrounding the featured image area 12.

In some exemplary embodiments of the disclosure, subsequent to printing the featured image 16 and the repeating images 18 that constitute the background area, a backing layer can be applied over or printed on the rear surface of substrate 22. It will be understood that a background image may be printed behind the repeating images in embodiments of the disclosure. In some exemplary embodiments of the disclosure, the backing layer is a printed white layer that overlays the featured image area 12 and background area 14. The printed white layer can be cured for permanency, such as by ultraviolet light curing.

In some exemplary embodiments of the disclosure, rather than printing a white layer (which can be time and energy-consuming), a thin sheet of translucent vinyl 24 is applied to the rear of substrate 22 overlying the printing. The vinyl 24 can have translucent qualities allowing at least some light to pass through. In some exemplary embodiments of the disclosure, the vinyl can be white or off-white in color. It will be understood that the vinyl layer may be applied using any of various laminators, such as roll laminators. The roll laminators can use adhesive and heat and pressure to apply the vinyl layer 24. Any excess vinyl can be cut by a blade, either by hand or machine.

After the vinyl layer 24 is affixed to the rear side of substrate 22, the substrate 22 is then oriented face up and inserted into a printer for a second pass. In the second pass, lenses 20 are printed on the front of the panel 10 using a pre-determined template corresponding to the background area 14 on the rear of the panel 10. In this regard, lenses 20 are applied to the front surface of substrate 22 substantially only in areas that have corresponding repeating images printed on the rear side of the panel 10. As shown, areas corresponding to the featured image 16 (e.g., helmet) on the front of the panel 10 are not provided with lenses 20. The lenses 20 can have a three-dimensional dome structure.

After the lenses 20 are applied, a primer layer 26 is applied using a print head. The primer layer 26 is applied atop the front of substrate 22 covering substantially the entire surface of the front surface of panel 10. The primer layer 26 can be applied with one or more passes through the printer. The primer layer 26 can be formulated to provide permanent ink adhesion for the printed lenses to the substrate 22, which can help prevent the lenses 20 from peeling off. The primer has plastic-adhesion qualities which contribute to the permanent/archivable properties of a finished panel 10 in accordance with embodiments of the disclosure. In some exemplary embodiments of the disclosure, the primer layer 26 applied to substrate 22 contains a small amount of photoinitiators or similar photocurable substance. In embodiments, the primer layer 26 can include a wetting agent.

After the primer layer 26 is applied to the substrate 22, the substrate 22 can be subjected to a source of ultraviolet light which causes curing of the primer layer 26, thereby further enhancing the permanency and archivability of panel 10. In some exemplary embodiments of the disclosure, ultraviolet light is applied immediately after the primer layer is applied for curing. A printer can be used to apply the ultraviolet light (one or more passes for curing to take effect), or alternatively, the substrate 22 can be passed through or provided in a ultraviolet light tunnel for faster curing. In some exemplary embodiment, the ultraviolet light used can have an approximately 460 nanometers wavelength.

In some exemplary embodiments of the disclosure, one or more methods are provided of producing a multi-dimensional image that is archivable. In an exemplary first step, a computer is utilized to map out at least two areas within a defined space, for example, a featured image area 12 and a neighboring background area 14. Mapping coordinates are saved in a computer memory. Next, an image file is selected for printing an image in the featured area 12 and a second image (e.g., a football) is selected to be printed in repeated fashion in an area adjacent to or neighboring the featured area 12 (e.g., background area 14).

In some exemplary embodiments of the disclosure, a transparent or translucent substrate (e.g., a plastic panel) is selected and placed in a suitable commercial printer. The substrate can be held (e.g., by registration pins) during printing. In some exemplary embodiments of the disclosure, a print head controlled by a computer program prints a reversed image in the featured area 12 on the rear side of the substrate so that the image appears properly oriented when viewed from the front surface. Repeating images are similarly printed in an area neighboring the featured area 12.

In some exemplary embodiments of the disclosure, the panel 10 is then removed from the printer and run through a laminator, whereby a vinyl layer is applied over the printed area on the rear side of the panel 10. In some exemplary embodiments of the disclosure, the vinyl material is white. Still in other embodiments, the vinyl material allows for the passage of some light.

The panel is then returned to the printer or brought to a different printer whereby a print head applies a series of small plastic dome-shaped lenses on the front surface of the panel 10. In some exemplary embodiments of the disclosure, lenses are only applied corresponding to (i.e., overlying) areas on the rear of the panel that correspond to the repeating images on the rear of the panel. For example, with reference to FIG. 1, lenses 20 are applied to areas corresponding to the background area 14. As such, lenses 20 enlarge and project the images that form the pattern in the background area 14. In some exemplary embodiments of the disclosure, a primer layer 26 can be applied on the front surface of the panel 10. In some exemplary embodiments of the disclosure, the panel is then subjected to ultraviolet light or is placed though a UV tunnel for final curing.

Figure 4:
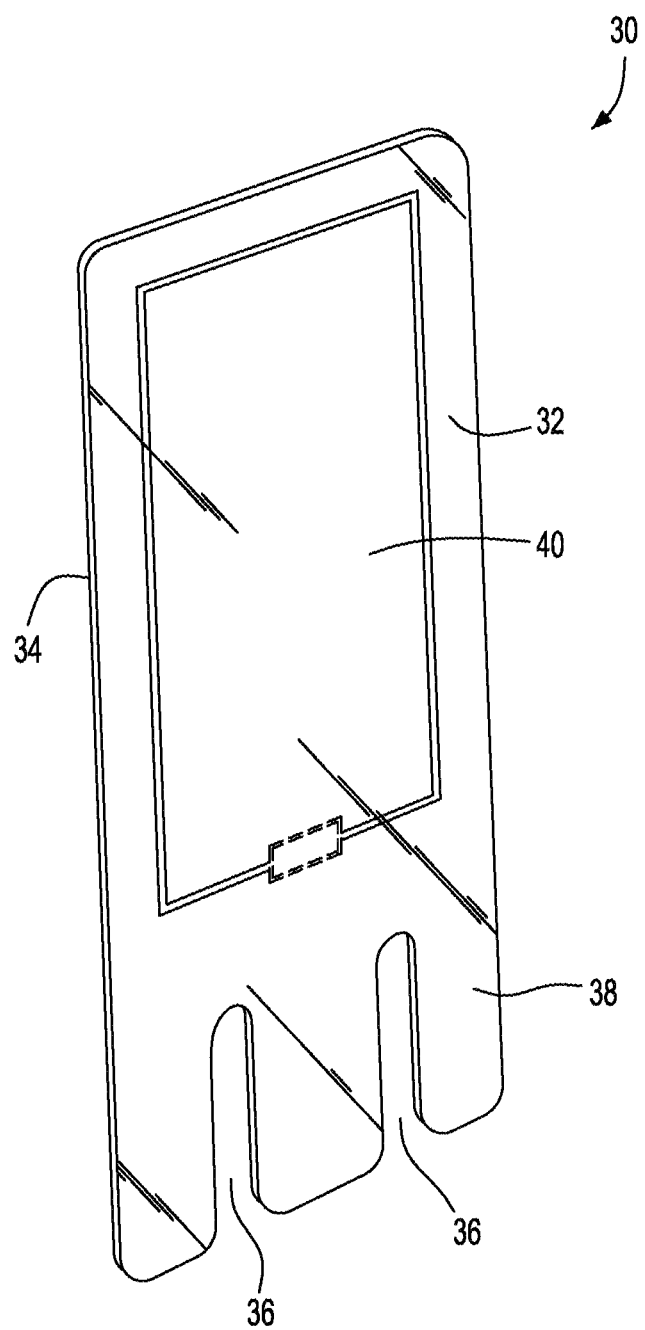
FIG. 4 is a perspective view of a header card embodying a three-dimensional pattern in accordance with the disclosure.

In some exemplary embodiments of the disclosure, a header card 30 is configured to project a multi-dimensional image as set forth herein. For example, as shown in FIG. 4 a header card 30 is shown having a front surface 32 and a rear surface 34. The header card 30 can be formed of any of different plastic materials. As shown, two elongated cutouts 36 are made in a bottom region 38. The cutouts 36 are configured to attach the header card 30 onto the edge of a box or similar thin wall.

In some exemplary embodiments of the disclosure, a frame 40 can be provided on the front surface 32 of the header card 30, whereby the area within the frame 40 is provided with a multi-dimensional image created in accordance with embodiments of the disclosure. For example, the rear surface of the frame 40 can have an image in reverse orientation printed with a pattern of repeating designs around the image within the border of the frame 40, and lenses can be applied on the front portion of the frame 40 on the front surface 32 of the header card 30. The header card 30 may be used in a public environment, such as for example, in a retail setting. In this regard, the header card 30 projects an attractive and captivating image that has the appearance of "moving" as a user walks past.

Various other considerations can also be addressed in the exemplary applications described according to the exemplary embodiments of the present disclosure. Various materials may be used to construct the elements described in the figures. For example, various materials can be used for the panel, such as a transparent or translucent plastic material, such as but not limited to plexiglass, acrylic, or polycarbonate or any combination thereof. Various sizes and dimensions of the panel can be provided, and the panel is not limited to any particular length, width or thickness. Various layers can be applied to the rear of the panel such as paint or other layers such as a vinyl layer. Various curing methods can be used for curing any ink or lenses on the substrate. Various additives can be used for the primer layer to help secure the lenses to the substrate.

Various advantages can be provided based on the exemplary embodiments described above. For example, the panel or card can provide a featured image, and repeating designs that appear to be larger and on a different plane covered by the lenses. The lenses also provide for greater depth of the design on the bordering image. This allows for an attractive appearance to catch a user's eye for any retail advertising, as well as a three-dimensional appearance for any image, such as but not limited to a sports or entertainment image.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure.

What is claimed is:

1. A method of forming an image panel, comprising:
   providing a flat substrate having an upper surface and an underside surface;
   printing an image in reverse orientation onto a first section of the underside surface of the flat substrate;
   printing a series of repeating images on a second section of the underside surface of the flat substrate;
   applying a series of lenses a first section of the upper surface of the flat substrate; and
   applying a substantially white coating the underside surface of the flat substrate, whereby substantially white coating covers the reverse printed image and the series of repeating images printed on the underside surface of the flat substrate.

2. The method of forming an image panel of claim 1, further comprising the step of applying a primer layer the upper surface of the flat substrate.

3. The method of forming an image panel of claim 2, further comprising the step of curing the primer layer.

4. The method of forming an image panel of claim 3, wherein the curing step comprises UV curing.

5. The method of forming an image panel of claim 4, whereby the step of applying a series of lenses to the first section of the upper surface of the flat substrate comprises overlying the series of lenses over the repeating images on the second section of the underside surface of the flat substrate.

* * * * *